Jan. 21, 1936.    A. BRUNNER    2,028,316
HOSE FITTING
Filed Oct. 16, 1933
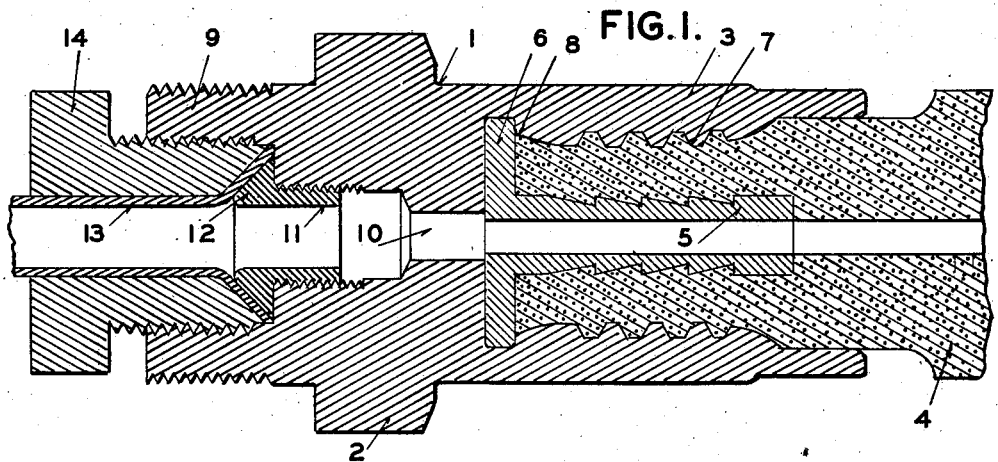
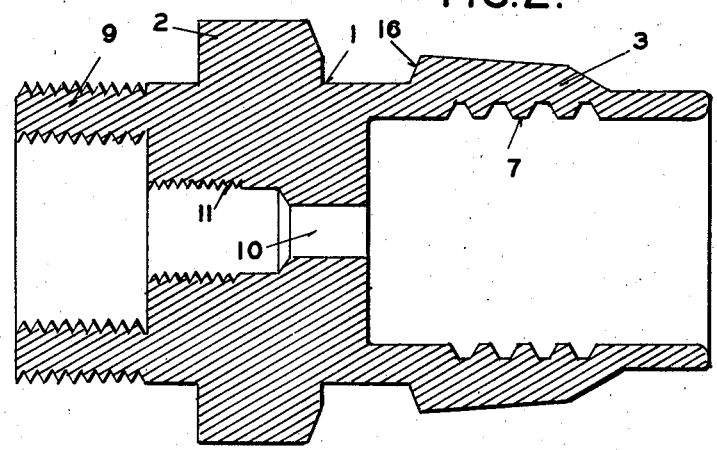
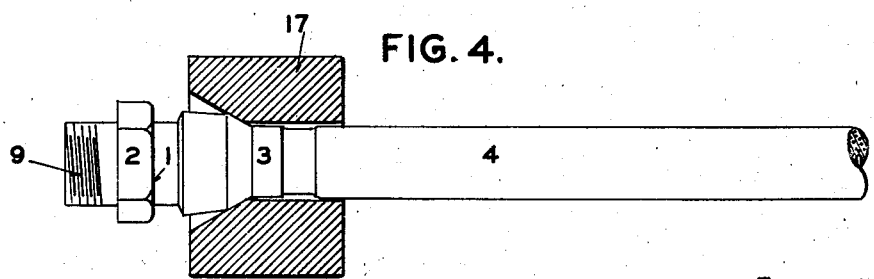
Inventor
ALBERT BRUNNER
By E. E. Huffman
Att'y.

Patented Jan. 21, 1936

2,028,316

UNITED STATES PATENT OFFICE 2,028,316

HOSE FITTING

Albert Brunner, St. Louis, Mo., assignor to Wagner Electric Corporation, St. Louis, Mo., a corporation of Delaware Application October 16, 1933, Serial No. 693,711

2 Claims. (Cl. 285—84)

My invention relates to a fitting or coupling member to be secured to the end of a hose or flexible conduit embodying rubber or other compressible material whereby the hose may be connected to another conduit or a fluid chamber.

One of the objects of my invention is to form, in an economical way, a simple connection between a hose and a fitting member which will not only be mechanically secure but also fluid-tight under very high pressure, as for example, the pressures developed in a hydraulic brake system.

A more specific object of my invention is to provide the end of a hose with a flanged nipple and to so initially form the tubular hose receiving extension of a hose fitting member that when the extension is compressed on the hose end, it will engage and hold the flange of the nipple in pressure engagement with the body of the fitting member.

Another object of my invention is to provide a fitting member with a separately formed conical seat for cooperation with the flared end of a tubular conduit which is adapted to be secured to the fitting member.

Other objects of my invention will become apparent from the following description taken in connection with the accompanying drawing in which Figure 1 is an enlarged cross-sectional view of the assembled hose, tubular conduit, and fitting member embodying my invention; Figure 2 is an enlarged cross-sectional view of the fitting member as initially formed. Figure 3 is a view of the conical seat member before it is attached to the fitting member; and Figure 4 is a view showing the method of compressing the tubular extension of the fitting member.

Referring to the drawing, the numeral 1 indicates the main body of the fitting member which is provided with the usual wrench-receiving portion 2. A tubular extension or sleeve 3, integral with the main body, is adapted to receive the end of the compressible flexible hose 4 made of a suitable material, as for example, rubber or rubber and fabric. A nipple 5 lies within the bore of the hose and is provided with a flanged end 6 interposed between the end of the hose and the body of the fitting member. The tubular extension 3 is formed with internal serrations 7 and is radially compressed to tightly clamp the hose between it and the nipple. The tubular extension is also provided with an internal shoulder 8, formed during the contraction of the extension, for engaging the rear of the flange 6 of the nipple to force it into pressure engagement with the wall of the body of the fitting and also prevent withdrawal of the nipple from the extension.

The body of the fitting also has integral therewith an internally-threaded tubular extension 9, which is in communication with the bore of the hose by means of the passage 10 through the body of the fitting. The outer end of the passage is enlarged and provided with threads or serrations 11 whereby a cone-shaped member 12 may be secured to the fitting for cooperation with the flared end of the copper tube 13. The flared end of the copper tube is held in fluid-tight engagement with the cone-shaped member 12 by means of the nut 14 cooperating with the internal threads on the extension 9. The extension 9 is also provided with external threads whereby the fitting may be clamped to a suitable support if desired.

The formation of a cone-shaped member separate from the fitting for cooperation with the flared end of tube 13, is an important feature of my invention. In prior fittings of the type disclosed, this cone-shaped member was either integral with the fitting, or formed on the end of the nipple which extended through passage 10 into the bore of the hose. In the construction shown, it is impossible to form this cone-shaped member on the flanged nipple since the nipple lies wholly within the tubular extension 3. If the cone were formed integral with the fitting, expensive drilling would be necessary which would be accompanied by frequent breakage of bits due to the inconvenient position of the cone in the base of the extension 9. In the construction shown, the cone-shaped member is initially shaped, as shown in Figure 2, with the smooth tubular extension 15 of slightly conical shape. To firmly secure this member in the opening 10, the extension is placed therein and then expanded by a suitable punch, thereby causing the threads or serrations 11 to become imbedded in the relatively soft material of the extension.

The extension 3 of the fitting is initially formed as shown in Figure 2. The internal diameter of the extension is uniform throughout and of slightly larger diameter than the normal external diameter of the hose. The inner surface of the extension is provided with the serrations 7. The wall of the extension at a point 16 spaced from the body of the fitting, is abruptly increased in thickness, which thickness decreases adjacent the outer end of the extension.

In assembling and securing the hose to the fitting, the hose end is first ground to the desired external diameter and then the nipple 5 inserted in the bore thereof to a point where the flange 6 will abut the end of the hose. The nipple and hose end are then placed in the extension of the fitting member with the flange 6 abutting the body of the fitting. The extension 3 of the fitting is now forced through a reducing die 17, (shown in Figure 4) the diameter of which is approximately the same as the external diameter of the open end of the extension, thereby progressively contracting the extension from a point spaced inwardly from the open end to a point beyond the point 16, and tightly compressing the hose between the nipple and the extension and forcing the serrations into the hose material. This contraction of the extension also produces the shoulder 8 which engages the flange of the nipple and locks the flange in pressure engagement with the body of the fitting.

The hose end, when attached to the fitting, is prevented from pulling out of the extension by the compression between the nipple and the extension, and the imbedding of the serrations on the nipple and extension in the hose material. This produces a very strong joint which will prevent the hose from becoming disconnected from the fitting under the highest fluid pressure to which the hose may be subjected. Fluid under pressure cannot leak between the flange and the body of the fitting since, during contraction of the extension, the flange is jammed tightly against the wall of the fitting and held there by the shoulder 8. Since the outer end of the extension is not contracted, the hose will have the desired free bending movement relative to the extension. Although the nipple is shown as being serrated, it may be made smooth if desired without appreciably decreasing the holding effect of the assembly.

It is also pointed out that my improved method of attaching the fitting to the hose lends itself very readily to firmly secure to the fitting, hose formed of material of different softness as the amount of compression of the hose wall between the nipple and extension may be varied by varying the diameter of the contracting die. All of the parts of the coupling are easily produced as only simple machining and drilling operations are necessary, thus resulting in low cost of manufacture.

Having fully described my invention, what I claim as new and desire to secure by Letters Patent of the United States is:

1. In combination, a coupling member adapted to be attached to the end of a hose, comprising a body portion and a tubular extension to receive the hose end, the bore of said extension being of substantially the same diameter as the external diameter of the hose, a nipple extending into the hose and having a flanged end interposed between the body portion and the hose end and said tubular extension being adapted, when it is deformed by being radially contracted from adjacent its open end to a point adjacent the flange of the nipple, to form an integral shoulder engaging the rear of the flange of the nipple and holding the flange in pressure engagement with the body portion of the coupling member.

2. In combination, a coupling member comprising a body portion and a tubular extension carried thereby, a hose having its end embraced by said extension, a nipple extending into the bore of the hose and having a flanged end interposed between the body portion of the coupling member and the end of the hose, the thickness of the wall of said tubular extension being greater adjacent and rearwardly of the position of the flange of the nipple than at other portions whereby an internal shoulder may be formed engaging the rear of the flange when the tubular extension is passed into a die to deform the extension by radially contracting it rearwardly of the flange.

ALBERT BRUNNER.